No. 775,805. PATENTED NOV. 22, 1904.
E. EINFELDT.
TRACTION WHEEL.
APPLICATION FILED MAY 6, 1904.
NO MODEL.
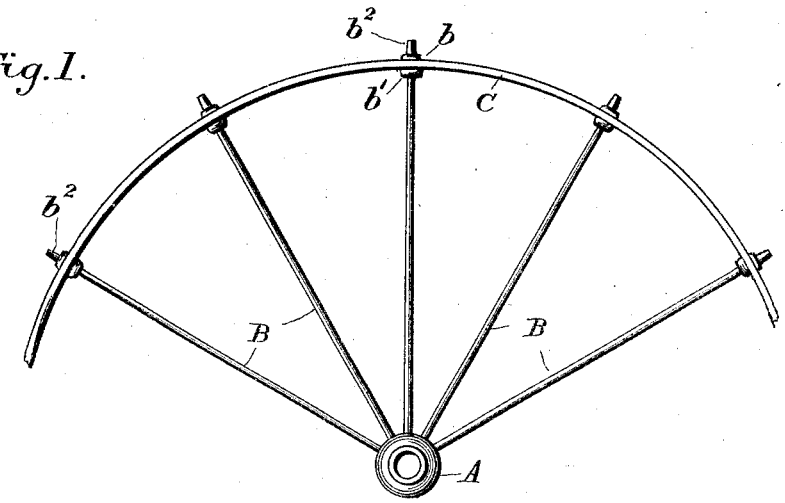
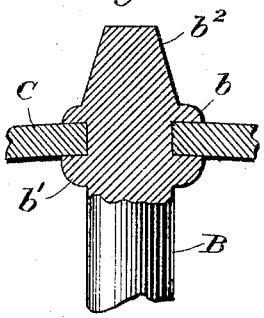
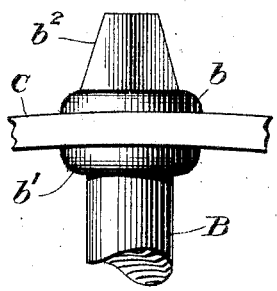
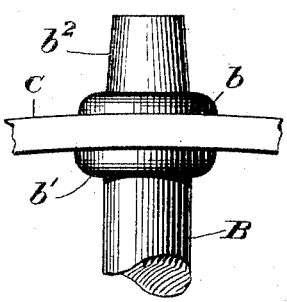
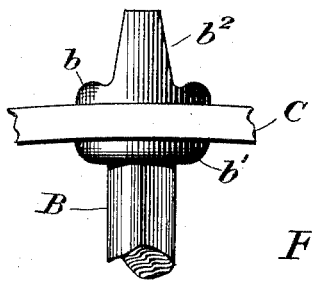
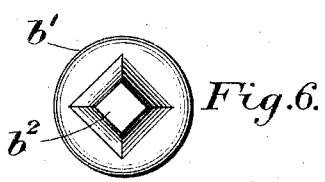
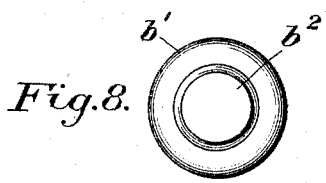
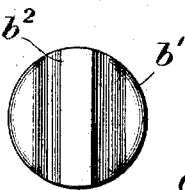
Witnesses
F. S. Elmore
A. M. E. Kennedy
Inventor
Emil Einfeldt
By P. T. Dodge
Attorney No. 775,805.

Patented November 22, 1904.

UNITED STATES PATENT OFFICE.

EMIL EINFELDT, OF DAVENPORT, IOWA, ASSIGNOR TO BETTENDORF METAL WHEEL COMPANY, A CORPORATION OF IOWA.

TRACTION-WHEEL.

SPECIFICATION forming part of Letters Patent No. 775,805, dated November 22, 1904.

Application filed May 6, 1904. Serial No. 206,722. (No model.)

*To all whom it may concern:*

Be it known that I, EMIL EINFELDT, a citizen of the United States, residing at Davenport, in the county of Scott and State of Iowa, have invented a new and useful Traction-Wheel, of which the following is a specification.

The object of this invention is to produce a traction-wheel of simple and durable construction; and the invention consists of a wheel having the spokes firmly secured at their inner ends to the hub and having their outer ends extending through and terminating some distance beyond the outer face of the rim and provided with integral confining-shoulders, one situated on the spoke at a considerable distance inward of its outer extremity and disposed in forcible engagement with the outer face of the rim and the other shoulder disposed in forcible engagement with the inner face of the rim.

In the accompanying drawings, Figure 1 is a side elevation of my improved wheel. Fig. 2 is a sectional view through one of the spokes and the adjacent portion of the rim. Figs. 3, 4, and 5 are elevations showing the different forms of the traction-lugs. Figs. 6, 7, and 8 are plan views of the same.

Referring to the drawings as shown particularly in Figs. 1 and 2, my improved wheel consists of a hub A, to which are secured in any suitable manner the inner ends of metal spokes B, whose outer ends are passed through holes in a rim C and terminate a considerable distance beyond the outer face of the rim, the spokes being firmly attached to the rim by two confining-shoulders, an outer one, $b$, integral with the spoke and in forcible engagement with the outer face of the rim and an inner one, $b'$, in forcible engagement with the inner face of the rim. The outer confining-shoulder $b$ is situated a considerable distance inward of the extremity of the spoke, so that the latter projects a corresponding distance beyond it and beyond the rim, the result being that a series of traction-lugs $b^2$ are produced throughout the circumference of the rim, which lugs are continuations and form integral parts of the respective spokes. A wheel of this construction will possess great strength and will be effective and durable in action, and by reason of the utilization of the outer ends of the spokes for traction-lugs the end thrust or pressure to which they are in practice subjected will be received directly by the spokes in the direction of their axes.

The ends of the spokes constituting the traction-lugs $b^2$ may be differently shaped or fashioned in order to meet the various conditions in practice as regards the character of the wheel and its intended use. As shown in Figs. 3 and 6, the body of the spoke is cylindrical in cross-section, while the traction-lug is rectangular in cross-section and slopes from its outer end outward to the confining-shoulder $b$. In Figs. 4 and 7 the body of the spoke is elliptical in cross-section, and the end forming the traction-lug is rectangular and elongated and also slopes outward to the confining-shoulder. In Figs. 5 and 8 the body of the spoke is cylindrical in cross-section and also the traction-lug, which, as in the other cases, slopes from its outer end outward toward the rim.

The essence of the invention resides, broadly, in forming the traction-lug as an integral continuation of the outer end of the spoke beyond the rim, and it is obvious that the manner of securing the spoke to the rim and the form of the traction-lug may be variously modified without departing from the limits of my invention.

I prefer to form the outer confining-shoulder and to shape the end of the spoke to constitute the traction-lug at a single operation by means of a female die of a form which it is desired that the lug shall be, the cavity of which die should be of a depth less than the length of that portion of the spoke projecting beyond the rim before it is acted on. The spoke being preferably first heated and passed through the rim and held fixedly, the die is seated over this projecting end and forcibly advanced toward the rim, which action will upset the spoke adjacent to the rim and form the confining-shoulder $b$, and simultaneously the end of the spoke will fill the cavity in the die and be caused to take the shape of the same.

Having thus described my invention, what I claim is—

As a new article of manufacture a traction-wheel comprising a hub, rim and spokes, the spokes being firmly secured at their inner ends to the hub and having their outer ends extending through and terminating some distance beyond the outer face of the rim and provided with integral confining-shoulders, one in forcible engagement with the outer face of the rim and at a point on the spoke a considerable distance inward of its extremity, and the other shoulder in forcible engagement with the inner face of the rim.

In testimony whereof I hereunto set my hand, this 21st day of September, 1904, in the presence of two attesting witnesses.

EMIL EINFELDT.

Witnesses:
   M. Louise Dodge,
   Andrew Neilson.